United States Patent
Iida et al.

(10) Patent No.: US 10,196,085 B2
(45) Date of Patent: Feb. 5, 2019

(54) ELECTRIC POWER STEERING DEVICE

(71) Applicant: Mitsubishi Electric Corporation, Tokyo (JP)

(72) Inventors: Hajime Iida, Tokyo (JP); Hiroshi Gokan, Tokyo (JP); Kenji Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/541,081

(22) PCT Filed: Feb. 26, 2015

(86) PCT No.: PCT/JP2015/055629
§ 371 (c)(1),
(2) Date: Jun. 30, 2017

(87) PCT Pub. No.: WO2016/135923
PCT Pub. Date: Sep. 1, 2016

(65) Prior Publication Data
US 2017/0369092 A1    Dec. 28, 2017

(51) Int. Cl.
*B62D 5/04* (2006.01)
*H02K 1/27* (2006.01)
(Continued)

(52) U.S. Cl.
CPC .......... *B62D 5/046* (2013.01); *B62D 15/0235* (2013.01); *H02K 1/27* (2013.01);
(Continued)

(58) Field of Classification Search
CPC ............ B62D 5/046; H02K 1/027; H02P 6/06
(Continued)

(56) References Cited

U.S. PATENT DOCUMENTS

2010/0283416 A1* 11/2010 Onishi ............... H02P 6/18
                                                            318/400.09
2012/0273290 A1* 11/2012 Kawano ............ B62D 5/046
                                                                 180/443

FOREIGN PATENT DOCUMENTS

JP    2012-046047 A    3/2012
JP    2012-231588 A    11/2012
(Continued)

OTHER PUBLICATIONS

JP-2014079033-A english EPO translation.*
International Search Report of PCT/JP2015/055629, dated May 26, 2015. [PCT/ISA/210].

*Primary Examiner* — Yazan A Soofi
(74) *Attorney, Agent, or Firm* — Sughrue Mion, PLLC; Richard C. Turner

(57) ABSTRACT

In an electric power steering device assisted by a brushless motor, an induced voltage from a brushless motor is detected when a main power supply is off. The motor is determined to be in a high rpm state when the induced voltage is in a first transient state from a voltage≤a high rpm detection threshold Th1 to a voltage≥Th1, thereby setting an intermittent excitation cycle of a revolution angle sensor connected to the motor to a short cycle. The motor is determined to be in a low rpm state when the induced voltage becomes a voltage≥a high rpm detection threshold Th2 after a wait period corresponding to an electrical angle between peaks or valleys of an output voltage has elapsed in a second transient state from a voltage≥Th1 to a voltage≤Th2, thereby setting the cycle to a long cycle.

12 Claims, 6 Drawing Sheets

(51) Int. Cl.
*H02P 6/06* (2006.01)
*B62D 15/02* (2006.01)
*H02K 21/14* (2006.01)
*H02K 11/215* (2016.01)
*H02P 6/182* (2016.01)
*H02P 6/17* (2016.01)
*H02P 23/00* (2016.01)
*H02P 23/03* (2006.01)

(52) U.S. Cl.
CPC .......... *H02K 11/215* (2016.01); *H02K 21/14* (2013.01); *H02P 6/06* (2013.01); *H02P 6/17* (2016.02); *H02P 6/182* (2013.01); *H02P 23/0086* (2013.01); *H02P 23/03* (2013.01); *H02P 2203/05* (2013.01)

(58) Field of Classification Search
USPC .......................................................... 701/41
See application file for complete search history.

(56) References Cited

FOREIGN PATENT DOCUMENTS

| | | | |
|---|---|---|---|
| JP | 2014-079033 A | | 5/2014 |
| JP | 2014079033 A | * | 5/2014 |
| WO | 2009/110206 A1 | | 9/2009 |

* cited by examiner

ELECTRIC POWER STEERING DEVICE

CROSS REFERENCE TO RELATED APPLICATIONS

This application is a National Stage of International Application No. PCT/JP2015/055629 filed Feb. 26, 2015, the contents of all of which are incorporated herein by reference in their entirety.

BACKGROUND OF THE INVENTION

1. Field of the Invention

The present invention relates to an electric power steering device for an automobile, and more particularly, to an electric power steering device for detecting a revolution angle and an rpm (revolution per minute) of a brushless motor with a revolution angle sensor, for calculating an absolute steering angle of a steering shaft of an automobile from the detected revolution angle and rpm, and for using the brushless motor to assist a steering force.

2. Description of the Related Art

As an electric power steering device of this type, for example, when a main power supply is on, an excitation coil of a resolver serving as a revolution angle sensor for a brushless motor is excited by an ordinary continuous sine wave. Further, when the main power supply is turned off, in order to reduce a consumed current of the battery, the excitation coil of the resolver is intermittently excited to detect a revolution angle and an rpm of the brushless motor by a backup circuit backed up by a battery of an automobile, thereby calculating a steering angle of a steering shaft of the automobile.

More specifically, there is known an electric power steering device in which specifically, when the main power supply is off, power is not supplied to the brushless motor, but when a steering wheel is turned for some reason, an induced voltage is conversely generated from the motor, so that depending on an electromotive force detected at a terminal of the brushless motor, intermittent excitation cycles are switched such that when the electromotive force is more than a determination threshold, the rpm is high, and thus the cycle of the intermittent excitation is decreased, that is, a division ratio is decreased. Meanwhile, when the electromotive force is less than the determination threshold, the rpm is low, and thus the cycle of the intermittent excitation is increased, that is, the division ration is increased (for example, see Japanese Patent No. 5140122).

The device described in Japanese Patent No. 5140122 divides one revolution of the resolver into four regions each corresponding to 90 degrees, namely, quadrants, in accordance with combinations of positive and negative detected voltages of two detection coils of the resolver, and monitors a state of the quadrant in each cycle of the intermittent excitation, thereby incrementing/decrementing an rpm counter. However, with this arrangement, reading of the angle is skipped in such a case where the steering wheel revolution is suddenly accelerated at the initial stage of the intermittent cycle and the revolution angle changes across one or more quadrants.

Moreover, in Japanese Patent No. 5140122, hysteresis is not provided for the determination threshold between a high rpm and a low rpm of the motor, but certain hysteresis based on two thresholds is necessary for an actual determination.

When an excited voltage in three phases is detected at a terminal of a three-phase brushless motor via, for example, a half-wave rectification circuit, the capacitance of a capacitor for smoothing in the rectification circuit is exclusively for measures against noise and is thus low, and as shown in FIG. 7, the detected voltage presents a waveform repeating between a peak and a valley after each predetermined electrical angle. Thus, unless a hysteresis width, namely, a hysteresis gap in this case is increased to equal to or more than a potential difference between the peak and the valley of the detected voltage, the rpm may be determined to be low even when the rpm is high.

However, when a threshold on a low rpm side, namely, a return detection threshold is decreased, a range of the rpm to which a low rpm mode is applied is narrowed, which is ultimately disadvantageous for decreasing the consumed current. Moreover, an upper limit is determined for a threshold on a high rpm side, namely, a detection threshold, in order to correctly detect the rpm of the motor even when the steering wheel is steered at a high speed.

Moreover, when the half-wave rectification circuit is used to detect the excited voltage, a variation in a temperature characteristic of a forward voltage VF of a diode for the rectification is large, and the forward voltage VF ranges from 0.05 V to 0.40 V in the case of, for example, a Schottky diode. Considering that the excited voltage generation of the brushless motor is required to be detected at a voltage less than 1.0 V, the determination of the high rpm detection threshold and the return detection threshold for the low rpm detection, and stable detection operation under all conditions are thus difficult.

Originally, when the thresholds for the high rpm detection and the low rpm detection can be set while an intersection voltage of the three phases, namely, the valley voltage of FIG. 7 is used as a reference, the maximum electrical angle between the peaks or between the valleys is 120° when an ideal half-wave rectification circuit is used. Therefore, in light of a 0 V reference value M0 of the excitation voltage across the motor terminals, the voltage of the valley is $\sin(30°)=\sin(150°)=½$ of the peak. Thus, ideally, when the high rpm is considered to be detected when the valley becomes more than a certain intersection voltage, and ½ of the intersection voltage is determined to be the return threshold for the low rpm detection, the high rpm detection and the low rpm detection are stably switched for operations with respect to acceleration/deceleration of the motor.

However, in such a case as shown in FIG. 7 in which the motor having a low temperature characteristic of the induced voltage and a low induced voltage is used, the temperature is low, and the forward voltage drop VF of the rectification diode is large, the intersection voltage of the three phases becomes less than the forward voltage VF, and the two threshold voltages for the high rpm detection and the low rpm detection cannot be set when a valley point is used as a reference.

Even when the threshold is set in the peak section of the voltage region where the induced voltage is in excess of VF for the high rpm detection, and the low rpm detection threshold is set to a point R0 at which the rpm is zero and the rectification output voltage is 0 V, namely, the point R0 of the forward voltage VF of the rectification diode, a revolution detection signal when the revolution is made at a constant angular velocity around the high rpm detection presents hunting (vibration) due to the changes of the peak and the valley. In the worst case, the reading is to be skipped because the rpm is actually high during this 120°.

Moreover, when the induced voltage of a full-wave rectification circuit is detected, and the thresholds for the high rpm detection and the low rpm detection can be set while the intersection voltage of the three phases is used as the reference, the maximum decrease from the peak to the valley to be considered in a section corresponding to an electrical angle of 60° between the peaks is only √3/2 while ½ for the half-wave rectification. Thus, the full-wave rectification detection is optimal compared with the half-wave rectification detection in this sense. However, in the case of the full-wave rectification, the rectification diode forward voltage VF is dropped double, and there still exists such a problem that the intersection voltage of the three phases is less than the double of the forward voltage VF.

Thus, as in the case of the half-wave rectification circuit described above, even when the threshold is set in the voltage region where the induced voltage is more than VF for the high rpm detection, and the low rpm detection threshold is set to the point R0 at which the rpm is zero and the rectification output voltage is 0 V, the revolution detection signal when the revolution is made at a constant angular velocity around the high rpm detection causes hunting (vibration) due to the change between the peak and the valley. In the worst case, the reading is skipped while the rpm is actually high during this 60°.

A sufficient induced voltage may not actually be acquired at a required rpm depending on a motor. Thus, when hysteresis is provided, the induced voltage becomes close to the GND level, so that there occurs such a case that the rpm is determined to be low, not to be restored. Meanwhile, when the waveform of each phase of the motor fluctuates up and down for sudden external fluctuation input of the rpm of the motor, and the valley point, which is the intersection, fluctuates up and down, a valley point that does not originally exist is erroneously detected as a result of the decrease of the valley point, causing the reading to be skipped.

SUMMARY OF THE INVENTION

The present invention has been made in view of the above-mentioned problem, and has an object to provide an electric power steering device capable of accurately detecting a revolution angle and rpm of a brushless motor based on a revolution angle sensor while reading of a threshold is not skipped even when revolution of a steering wheel is suddenly accelerated, by providing optimal hysteresis between two determination thresholds upon exciting the revolution angle sensor at intermittent cycles while a power supply is off.

In order to solve the above problem, an electric power steering device, according to the present invention, to be assisted by a brushless motor comprises a cycle switching part configured to:

detect an induced voltage from the brushless motor, which is revolved by an external force, via a rectification circuit when a main power supply (17) is off; compare the induced voltage with a high rpm detection threshold (Th1) and a low rpm detection threshold (Th2); determine that the brushless motor is in a high rpm state when the induced voltage is in a first transient state in which the induced voltage transitions from a voltage equal to or less than the high rpm detection threshold to a voltage equal to or more than the high rpm detection threshold, thereby setting an intermittent excitation cycle of a revolution angle sensor (8) connected to the brushless motor to a predetermined short cycle; and determine that the brushless motor is in a low rpm state when the induced voltage is in a third transient state in which the induced voltage becomes a voltage equal to or less than the low rpm detection threshold after a time at which a wait period corresponding to an electrical angle between peaks of an output voltage of the rectification circuit has elapsed in a second transient state in which the induced voltage transitions from a voltage equal to or more than the high rpm detection threshold to a voltage equal to less than the high rpm detection threshold, thereby setting the intermittent excitation cycle to a long cycle set in advance.

According to the present invention, when the terminal voltage of the brushless motor is detected to determine whether the rpm of the motor is high or low based on the two thresholds, the high rpm mode can continue when the detected voltage once becomes equal to or more than the high rpm determination threshold. Therefore, a hysteresis gap between the determination thresholds for the high rpm and the low rpm can be determined without the influence of the detected voltage waveform, so that a lower consumed current can be realized.

DESCRIPTION OF THE EMBODIMENTS

Figure 1:
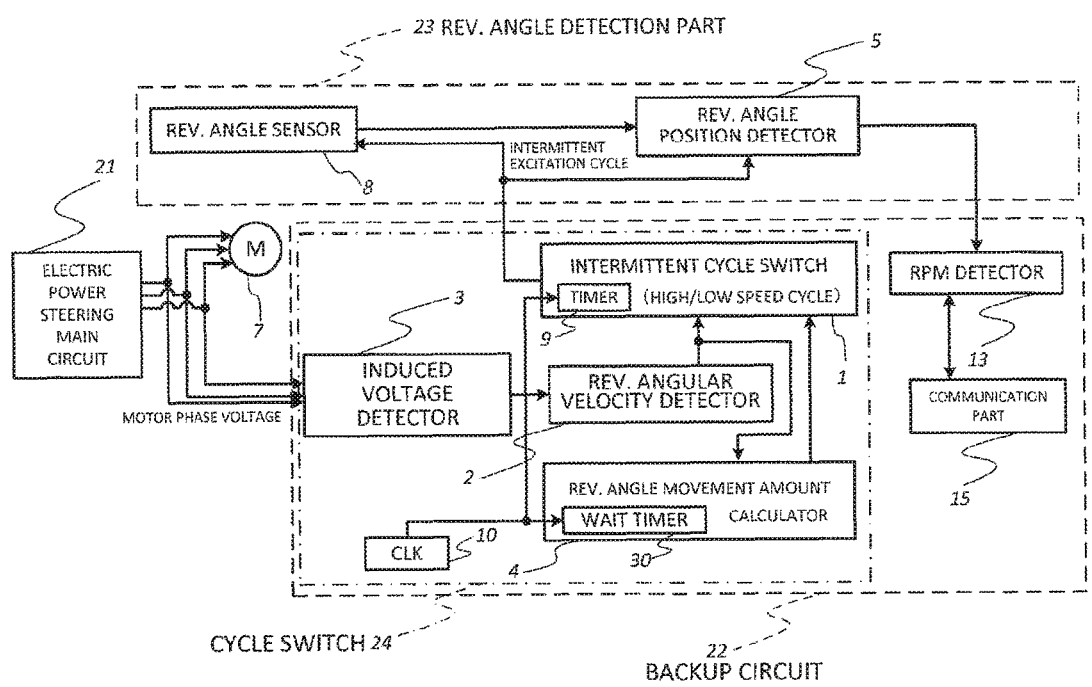
FIG. 1 is a circuit block diagram for illustrating an electric power steering device according to a first embodiment of the present invention.

A detailed description is now given of an electric power steering device according to the present invention with reference to the drawings for illustrating embodiments. Like or corresponding parts in the drawings are denoted by like reference symbols.

First Embodiment

An electric power steering device according to a first embodiment of the present invention illustrated in FIG. 1 includes: a three-phase brushless motor 7 including a rotor formed of k pairs of permanent magnets, where a P pole and an N pole of a permanent magnet for generating a steering force of an automobile form one pair, and a field coil group formed of h coils installed so as to be shifted by a predetermined angle from one another and having electric terminals for h phases; an electric power steering main circuit 21 for operating when a power supply is on; and a revolution angle detection part 23 and a backup circuit 22 each indicated by the dotted lines and connected to the main circuit 21. A shaft of the motor 7 is always directly coupled to a revolution shaft of a steering wheel via gears or the like.

The revolution angle detection part 23 indicated by the dotted lines includes a revolution angle sensor 8 for converting a revolution angle of the brushless motor 7 to an electric signal for extraction, and a revolution angle position detection part 5 for detecting a revolution angle position from the revolution angle signal. Moreover, the backup circuit 22 indicated by the dotted lines includes a cycle switching part 24 indicated by the long dashed short dashed line, an rpm detection part 13, and a communication part 15. Further, the cycle switching part 24 includes an intermittent cycle switching part 1, a revolution angular velocity detection part 2, an induced voltage detection part 3, and a revolution angle movement amount calculation part 4.

The induced voltage detection part 3 simultaneously inputs motor phase voltages from the main circuit 21 to the motor 7, providing detected induced voltages to the revolution angular velocity detection part 2. The revolution angular velocity detection part 2 has a name including "revolution angular velocity" because the waveform of the induced voltage represents "revolution angular velocity".

Figure 7:
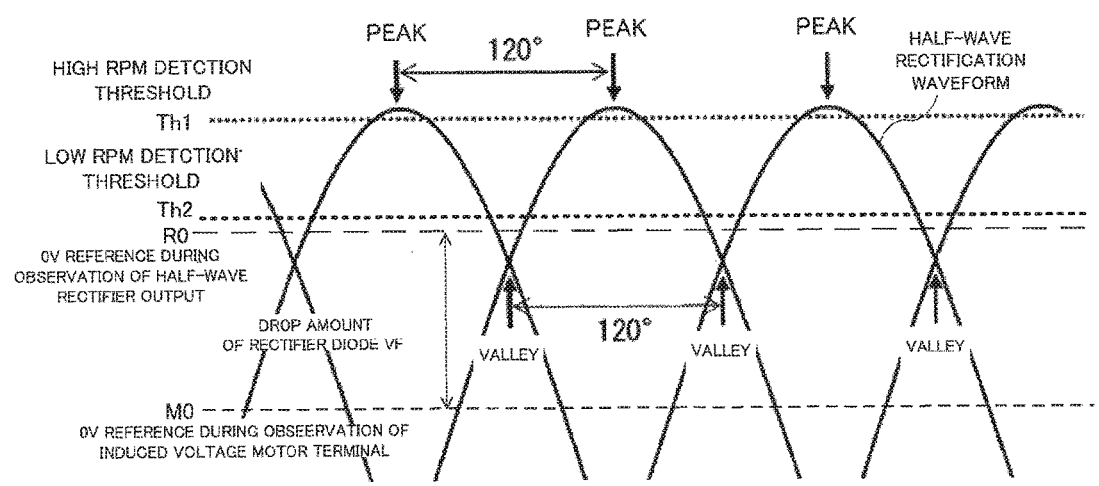
FIG. 7 is a graph for showing a relationship between a half-wave rectification waveform of induced voltages of a three-phase motor and thresholds used in the electric power steering device according to the respective embodiments of the present invention.

The revolution angular velocity detection part 2 compares the induced voltage with a high rpm detection threshold Th1 shown in FIG. 7 and a return detection threshold Th2 for low rpm detection, which is lower than the high rpm detection threshold Th1, for determination. The revolution angular velocity detection part 2 determines that the motor is in a high rpm state when the motor is in a first transition state in which the induced voltage changes from a voltage equal to or lower than the high rpm detection threshold Th1 to a voltage equal to or more than the high rpm detection threshold Th1, and provides to the intermittent cycle switching part 1 a signal for setting an intermittent excitation cycle for the revolution angle sensor 8 connected to the brushless motor 7 to a short cycle determined in advance, namely, a signal for decreasing the division ratio. Moreover, in a second transition state in which the induced voltage changes from a voltage equal to or more than the high rpm detection threshold Th1 to a voltage equal to or less than the high rpm detection threshold Th1, the revolution angular velocity detection part 2 provides a signal reporting the second transition state to the revolution angle movement amount calculation part 4.

As shown in FIG. 7 described later, the high rpm detection threshold Th1 is set to a value close to a peak at the minimum predicted high rpm of the motor 7 as an output of a rectification circuit in the induced voltage detection part 3. The output actually needs to be more than the threshold, and is thus set to a value slightly less than the value of the peak. Moreover, the low rpm detection threshold Th2 serving as the return detection threshold is set to a value close to a value R0, which is a forward voltage VF of a diode used for the rectification circuit, and is more than the maximum predicted value of the valley of the forward voltage VF. The output actually needs to be less than the threshold Th2, and is thus set to a value slightly more than R0.

Further, the revolution angular velocity detection part 2 determines that the motor is in a low rpm state when the motor is in a third transition state in which the induced voltage changes from the high rpm state to a voltage equal to or less than the low rpm detection threshold Th2, providing to the intermittent cycle switching part 1 a signal for setting the intermittent excitation cycle for the revolution angle sensor 8 to a long cycle determined in advance, namely, a signal for increasing the division ratio.

The revolution angle movement amount calculation part 4 incorporates therein a wait timer 30, and uses the wait timer 30 to count a clock 10 to measure a period from the reception of the second transition state from the revolution angular velocity detection part 2 to a time point of elapse of a wait period corresponding to an electrical angle between peaks of the rectified voltage acquired from the induced voltage. The revolution angle movement amount calculation part 4 then reports a state in which the count has reached the period to the intermittent cycle switching part 1.

The intermittent cycle switching part 1 incorporates therein a timer 9, and receives a signal relating to an intermittent cycle corresponding to the high rpm state or the low rpm state from the revolution angular velocity detection part 2, and provides a signal of the intermittent cycle to the revolution angle sensor 8 and the revolution angle position detection part 5. Simultaneously, the intermittent cycle switching part 1 waits, for a certain period based on the signal from the revolution angle movement amount calculation part 4, a signal output at an intermittent cycle corresponding to the low rpm.

The rpm detection part 13 of the backup circuit 22 receives the revolution angle position signal from the revolution angle position detection part 5 to calculate the rpm, and transmits the rpm to the main circuit 21 via the communication part 15.

Figure 2:
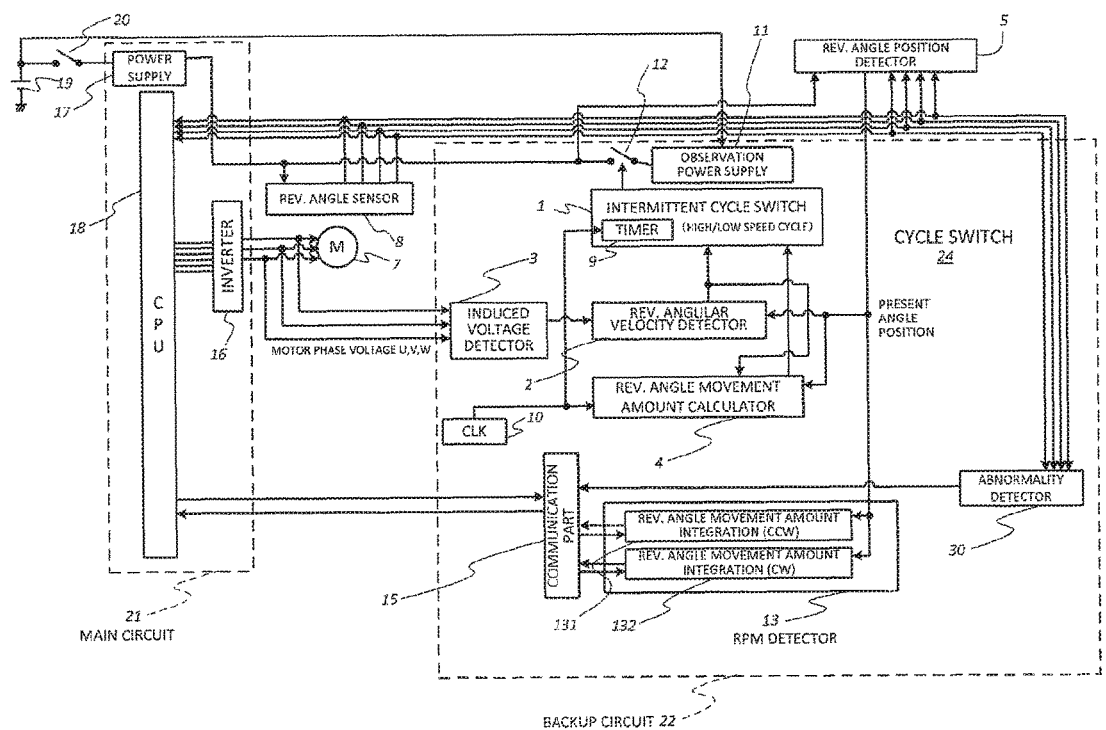
FIG. 2 is a circuit block diagram for illustrating a specific example of the electric power steering device according to the first embodiment of the present invention.

FIG. 2 is a circuit block diagram for illustrating a specific circuit example of the first embodiment illustrated in FIG. 1. When a switch 20 is turned on, a power supply 17 is turned on to supply power to a CPU 18, an inverter 16, and the revolution angle sensor 8 in the main circuit 21, and the CPU 18 controls the revolution of the motor 7 via the inverter 16 while receiving information on the revolution angle sensor 8.

When the switch 20 is off and the motor 7 is not driven, and the revolution shaft of the motor 7 is revolved by an external force via a steering wheel, an observation power supply 11 is always in a power supply available state due to the power supply from the battery 19. While the revolution of the motor 7 is not detected by the intermittent cycle switching part 1, the power is intermittently supplied to the revolution angle sensor 8 and the revolution angle position detection part 5 by the switch 12 at the intermittent cycle.

The power is always supplied to the induced voltage detection part 3, the revolution angular velocity detection part 2, the revolution angle movement amount calculation part 4, the CLK 10, the intermittent cycle switching part 1, an abnormality detection part 30, a counterclockwise revolution angle movement amount (CCW) integration part 131, and a clockwise revolution angle movement amount (CW) integration part 132 from the observation power supply 11 for operation. The revolution angle position of the motor is integrated in the revolution angle movement amount integration part 131 and the revolution angle movement amount integration part 132 when the switch 20 is off. The power is first supplied to the communication part 15 when the switch 20 is turned on, and the counterclockwise revolution angle movement integration amount CCW and the clockwise revolution angle movement integration amount CW of the revolution angle movement amount integration parts 131 and 132 are transmitted from the communication part 15 to the CPU 18.

When the main power supply 17 of the electric power steering device is turned on so that motor phase voltages U, V, and W are supplied from the electric power steering main circuit 21 to the brushless motor 7, and a revolution force is applied from the driver to the steering wheel on this occasion, revolution angle position information is acquired from the revolution angle detection part 23 including the revolution angle sensor 8 such as a resolver mounted to the brushless motor 7 coupled to a steering shaft (not shown) via gears. An assist function of the brushless motor 7 is exerted on the steering shaft by calculating the rpm of the brushless motor 7 from a change amount of the revolution angle position information, and calculating and holding the steering angle of the connected steering shaft.

While the main power supply 17 is shut off by, for example, removing a key from the automobile and the assist function is stopped, the electric power steering main circuit 21 is shut off, and the assist function is stopped. On this occasion, the power supply is backed up by the battery 19 of the automobile, and thus, for example, when the driver carries out an operation such as the revolution of the steering wheel and an external force is applied to the steering shaft during the stop of the vehicle, an excitation signal is supplied from the backup circuit 22 to the revolution angle sensor 8, so that the rpm is calculated from a change amount of the revolution angle position information from the revolution angle sensor 8. The steering angle of the steering shaft connected to the brushless motor 7 via the gears is calculated and held.

The communication part 15 has a function of transmitting, via serial communication means, the rpm detected by the rpm detection part 13 after the main power supply 17 is turned on and the CPU 18 forming the electric power steering main circuit 21 starts the operation, continuing a subsequent rpm measurement by the CPU 18 after the CPU 18 receives the rpm and when the main power supply 17 is turned off next time, receiving an rpm measurement value by the CPU 18 via the serial communication means in order to continue the subsequent rpm measurement by the backup circuit 22 using the excitation at the intermittent cycle, and passing the rpm measurement value to the rpm detection part 13.

The description will now be given of an operation when the main power supply 17 is turned off.

When the revolution shaft of the brushless motor 7 is revolved by an external force, and induced voltages having amplitudes proportional to the rpm of the brushless motor 7 are thus generated on the terminals of the motor 7, the induced voltage detection part 3 detects h electric signals corresponding to the h phases of the induced voltages on the terminals as the induced voltage.

Figure 5:
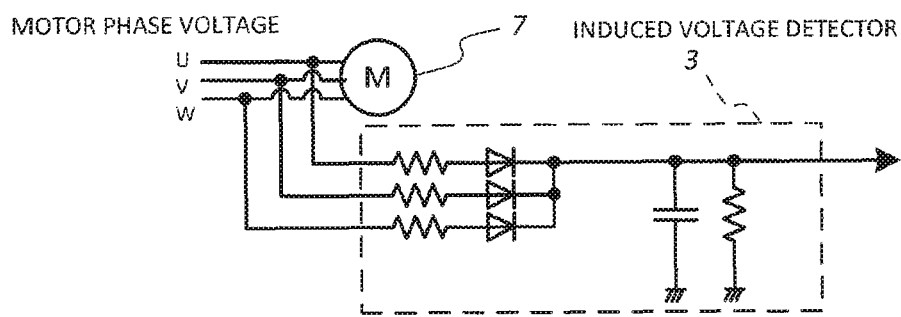
FIG. 5 is a circuit diagram for illustrating a half-wave rectification circuit as an Example of an induced voltage detection part used in the electric power steering device according to the respective embodiments of the present invention.

The revolution angular velocity detection part 2 includes a half-wave rectification circuit, for example, the one illustrated in FIG. 5 on an input side thereof. A smoothing circuit of the rectification circuit is intended solely to remove noise, and hence a rectified voltage after passing through the rectification circuit presents the waveform shown in FIG. 7 without being substantially smoothed because the capacitance of a smoothing capacitor is low, and is compared with the high rpm detection threshold Th1 and the low rpm detection threshold Th2 shown in FIG. 7.

When the rectified voltage transitions from a voltage equal to or less than the high rpm detection threshold Th1 to a voltage equal to or more than the high rpm detection threshold Th1, a control signal for setting the intermittent excitation cycle to a short interval, that is, for decreasing the division ratio, is transmitted to the intermittent cycle switching part 1. When the rectified voltage transitions from a voltage equal to or more than the low rpm detection threshold Th2 to a voltage equal to or less than the low rpm detection threshold Th2, the motor 7 is in the low rpm state, and a control signal for setting the intermittent excitation cycle to a long interval, that is, for increasing the division ratio, is transmitted to the intermittent cycle switching part 1.

The intermittent cycle switching part 1 incorporates the timer 9 for counting the clock (CLK) 10 to measure a period of time. Currents are caused to flow from the observation power supply 11 to the revolution angle sensor 8 and the revolution angle position detection part 5 at the intermittent cycle corresponding to the time interval of the timer 9 by switching on/off the switch 12 based on a trigger from the timer 9. As a result, the excitation coil of the revolution angle sensor 8 is excited, and the revolution angle of the motor 7 is detected. The detected revolution angle is transmitted to the revolution angle position detection part 5, thereby calculating the revolution angle position, and the revolution angle position is transmitted to the revolution angular velocity detection part 2 and the revolution angle movement amount calculation part 4.

The revolution angle movement amount calculation part 4 incorporates therein the wait timer 30 for counting the clock 10 independently of the intermittent excitation cycle signal from the timer 9, and acquires a wait period (time) twait_a of the wait timer 30 as a period in which the second transition state is maintained when the rectified voltage is in the second transition state as follows:

$$360 \text{ (deg)} \div h \div k \div (360 \text{ (deg)} \times 60 \text{ (sec)} \times r\_m(\text{rpm})) \quad (1)$$

where r_m (rpm) is an rpm of the revolution shaft of the brushless motor 7.

This is such a configuration that when a period required for the revolution shaft of the motor 7 to revolve by the angle_a (deg)=360 (deg)÷h (phase) is set as the wait period twait_a (sec), the timer 30 starts the count at the second transition from a rectified voltage equal to or more than the high rpm detection threshold Th1 to a rectified voltage equal to or less than the high rpm detection threshold Th1. The intermittent cycle switching part 1 is caused to wait for the setting of increasing the intermittent cycle at the third transition from a rectified voltage equal to or more than the low rpm detection threshold Th2 to a rectified voltage equal to or less than the low rpm detection threshold Th2 until the count reaches the wait period twait_a.

On this occasion, when the motor 7 is not driven by the phase power supply from the electric power steering main circuit 21, and the motor 7 is revolved by an external force applied to the revolution shaft, for example, the revolution of the steering wheel, an induced voltage proportional to the rpm is generated in each phase of the motor 7.

When the motor 7 having five pole pairs is supposed as a three-phase motor and the induced voltage detection part 3 is supposed as a half-wave rectification circuit as illustrated in FIG. 5, the induced voltage presents a sine wave voltage waveform of three phases whose the electrical angles are shifted from one another by 120° (360°÷(three phases)) as shown in FIG. 7.

Due to the peak-valley waveform shown in FIG. 7, hysteresis that is more than a voltage difference between the peak and the valley is required to be provided for voltage comparison in order to stably detect the voltage.

However, in a case of a motor having a low induced voltage constant, when the valley portion becomes less than the drop amount of the forward voltage VF of the diode of the half-wave rectification circuit for an rpm to be detected, the signal for returning to the intermittent cycle for the low rpm cannot be output.

Therefore, the revolution angle movement amount calculation part 4 is added in place of setting the hysteresis to be small. After the motor induced voltage decreases and the high speed cycle signal becomes invalid, a period of the revolution corresponding to the electrical angle of 120° at the rpm of the threshold for the induced voltage detection is measured by counting with the clock 10 for standby. Then, the intermittent cycle signal is output to the intermittent cycle switching part 1. The high speed cycle is maintained until then, and thus, even when the rpm of the motor is greatly accelerated in the course, the reading is not skipped.

When the rpm of the motor 7 monotonically decreases, after the period corresponding to the electrical angle 120° elapses, the cycle returns to the intermittent cycle corresponding to the low rpm state. When the acceleration occurs in this course, the induced voltage generation again reaches the peak at a time point when the revolution passes the electrical angle of 120°, and hence the induced voltage becomes more than the threshold Th1. As a result, the high speed cycle signal output to the intermittent cycle switching part 1, which is also input to the revolution angle movement amount calculation part 4, is asserted again, the period count corresponding to the electrical angle of 120° is reset, and the condition that the high speed cycle signal becomes invalid again is waited for.

In this way, in place of large hysteresis, which is hard to be set, the following processing is carried out as, for example, period processing based on a timer. Specifically, after the mode once enters the high rpm mode and the generation of the motor induced voltage becomes not enough for the high rpm detection, resulting in the highspeed cycle switching signal becoming invalid, the mode does not return to the low rpm mode for the period corresponding to the electrical angle movement amount equal to or more than 120° at the high rpm detection threshold angular velocity.

As a result, even when the detection signal enters a valley and the level decreases, which indicates a low rpm, but the revolution acceleration of the motor is actually increasing, the cycle is prevented from returning to the intermittent cycle for the low rpm. The revolution angular velocity is still observed at the high speed cycle without skipping the reading.

The threshold for returning to the low rpm cannot be set while the intersection voltage of the three-phase induced voltage is used as the reference, but the threshold for the low rpm can be adapted so as not to skip the reading for a motor having a low induced voltage.

Figure 6:
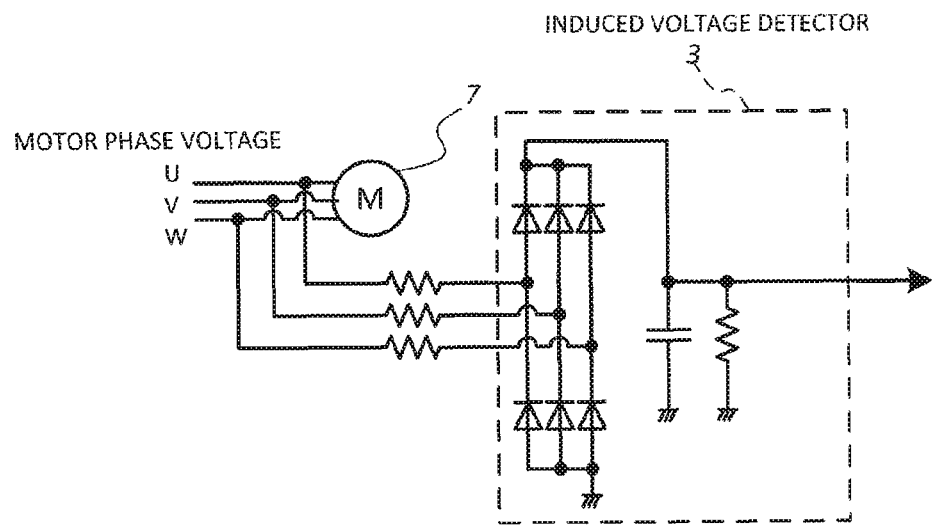
FIG. 6 is a circuit diagram for illustrating a full-wave rectification circuit as another Example of the induced voltage detection part used in the electric power steering device according to the respective embodiments of the present invention, and a circuit for illustrating full-wave rectification of an Example of induced voltage detection according to claim 1.

FIG. 6 is a circuit diagram for illustrating a case where the induced voltage detection part 3 is constructed by a full-wave rectification circuit. In the case of the full-wave rectification, the three-phase motor 7 presents a six-phase sine voltage waveform in which the phases of the electrical angles are shifted from one another by 60° (=360°÷((three phases)×2)). The voltage at the valley is more than that of the half-wave rectification, but the voltage drops by an amount of 2×(forward voltage VF), which corresponds to two diodes in the full-wave rectification. Thus, the full-wave rectification is not always advantageous over the half-wave rectification. The calculation in terms of the time or the angle position in the revolution angle movement amount calculation part 4 is based not on an electrical angle of 120°, but of 60°.

When the rpm of a three-phase motor having five pole pairs is predicted by using the induced voltage signal of the motor from the full-wave rectification circuit illustrated in FIG. 6, the electrical angle is five times as large as the mechanical angle, and the movement amount of the angle position over which the state is maintained in the high speed mode is 360°÷3÷2=60°. It is supposed that the state does not return to the low rpm mode for a period corresponding to an electrical angle movement amount equal to or more than 60° at the high rpm detection threshold angular velocity.

As described above, the detection threshold Th1 on the high rpm side is set to the maximum predicted value of the diode forward voltage VF of the rectification circuit. The threshold on the low rpm side, namely, the return detection threshold Th2 is set to the maximum predicted voltage value as the forward voltage VF of the rectification diode, namely, set in the neighborhood of the value R0 at which the rectified output voltage is substantially zero.

Moreover, in the embodiment of FIG. 2, the abnormality detection part 30 is used because the output signal of the revolution angle sensor 8 is indicated in the four quadrants and hence the read skipping is detected by monitoring the output signal, but the read skipping may occur although extremely slightly even when the setting on the wait timer is used.

Further, in the rpm detection part 13, the counterclockwise revolution angle movement amount (CCW) integration and the clockwise revolution angle movement amount (CW) integration can be used.

Second Embodiment

Figure 3:
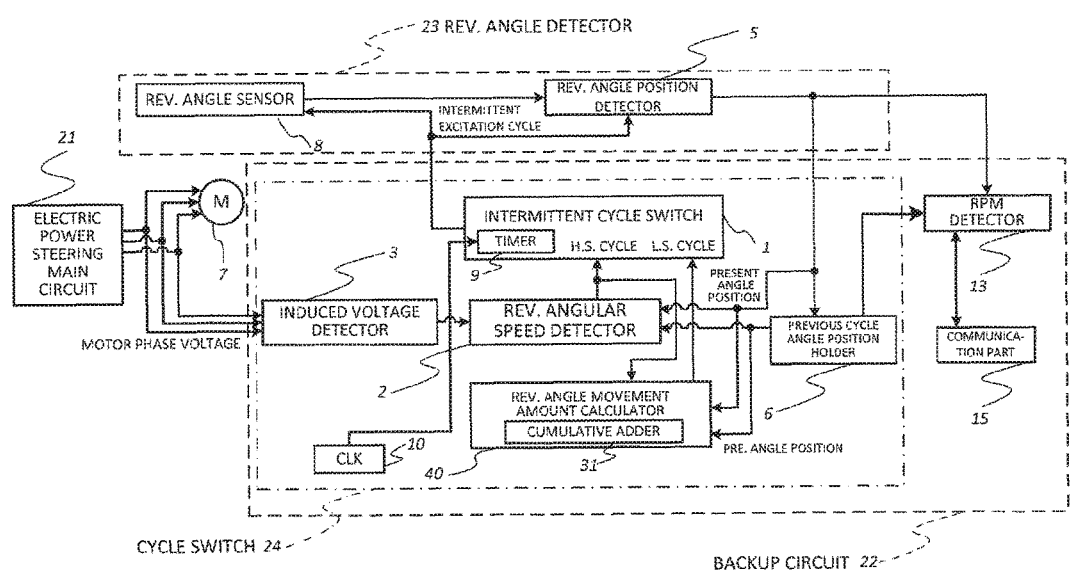
FIG. 3 is a circuit block diagram for illustrating an electric power steering device according to a second embodiment of the present invention.

In a second embodiment of the present invention illustrated in FIG. 3, compared with the first embodiment, in order to detect the elapsed period corresponding to the electrical angle of 120° or 60°, the movement amount for each cycle is recognized by a revolution angle movement amount calculation part 40 from a difference between the motor revolution angle position detected by the revolution angle sensor 8 and the angle position detection part 5 activated at the cycle generated by the intermittent cycle switching part 1 and an angle position one cycle before, which is held by a previous cycle angle position holding part 6. Then, an accurate movement amount corresponding to the electrical angle of 120° is calculated by cumulatively adding the movement amount for each cycle, and the intermittent cycle is switched to that for the low speed mode. Therefore, the revolution angle movement amount calculation part 40 incorporating therein a cumulative adder 31 is used. Thus, the cumulative adder 31 does not require the clock signal from the clock 10.

In place of the timer operation, for the angle confirmation for, for example, 60° or 120°, the angle position movement amount can be confirmed to be more than 60° or 120° by cumulatively adding the difference between the angle position at each intermittent cycle and the angle position one intermittent cycle before, thereby switching the state to the low rpm mode.

Figure 4:
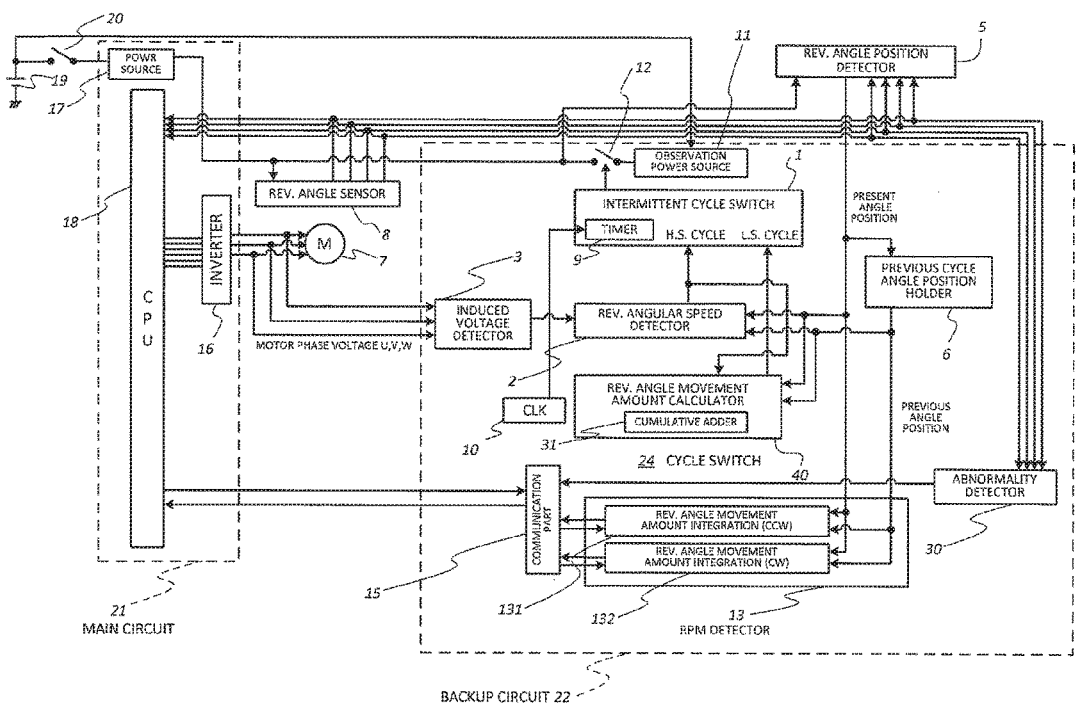
FIG. 4 is a circuit block diagram for illustrating a specific example of the electric power steering device according to the second embodiment of the present invention.

FIG. 4 is a diagram for illustrating a specific example of the second embodiment illustrated in FIG. 3. The abnormality detection part 30 is used in addition to FIG. 3 as in the first embodiment.

The half-wave rectification circuit of FIG. 5 and the full-wave rectification circuit of FIG. 6 are also applied to the second embodiment configured in this way.

When the deceleration is not monotonic and acceleration occurs during the accurate movement amount calculation for the electrical angle of 120° or 60°, the second embodiment operates in a manner similar to the first embodiment. There are several ways to realize the revolution angle sensor 8. When a resolver is used so that a current is caused to flow through an excitation part, electric signals are output by the electromagnetic induction on four signal lines. Moreover, when a magnet is mounted to the revolution shaft of the motor 7, a device having magnetic resistance or a Hall element is placed near the magnet, and a current is caused to flow through the device or the Hall element, the revolution of the magnet can be extracted as an electric signal.

As the motor rpm detection method, the revolution angular velocity detection part 2 may detect the motor rpm with the electric signal from the induced voltage detection part 3, or may detect the motor rpm from the difference between the output of the revolution angle position detection part 5 and the output from the previous angle position holding part 6. When the switch to the high speed cycle is possible based only on the information derived from the induced voltage, the switch to the high speed cycle is also possible based only on the angle position difference derived from the revolution angle sensor 8. Moreover, a method of calculating a logical AND of the information derived from the induced voltage and the information on the angle position difference derived from the revolution angle sensor 8 may be used to collate both pieces of information with each other, thereby enabling the switching of the cycle to the high speed cycle.

What is claimed is:

1. An electric power steering device to be assisted by a brushless motor, the electric power steering device comprising a cycle switching part configured to:

detect an induced voltage from the brushless motor, which is revolved by an external force, via a rectification circuit when a main power supply is off;

compare the induced voltage with a high rpm detection threshold and a low rpm detection threshold;

determine that the induced voltage is in a first transient state when the induced voltage transitions from a voltage equal to or less than the high rpm detection threshold to a voltage equal to or greater than the high rpm detection threshold;

determine that the induced voltage is in a second transient state when the induced voltage transitions from a voltage equal to or greater than the high rpm detection threshold to a voltage equal to less than the high rpm detection threshold;

determine that the induced voltage is in a third transient state when the induced voltage transitions from the first transient state to a voltage equal to or less than the low rpm detection threshold;

determine that the brushless motor is in a high rpm state when the induced voltage is in the first transient state, thereby setting an intermittent excitation cycle of a revolution angle sensor connected to the brushless motor to a predetermined short cycle; and determine that the brushless motor is in a low rpm state when the induced voltage enters into the third transient state after a wait period corresponding to an electrical angle between peaks of an output voltage of the rectification circuit has elapsed in the second transient state, thereby setting the intermittent excitation cycle to a predetermined long cycle.

2. The electric power steering device according to claim 1, wherein:

the brushless motor comprises a rotor composed of k pairs of permanent magnets, where a P pole and an N pole of a permanent magnet form one pair, and field coil groups each comprising h coils installed so as to be shifted by a predetermined angle from one another and having electric terminals with h phases;

the cycle switching part is configured to turn on/off a switch in accordance with a trigger from a timer configured to count a clock to measure a period, thereby causing a current to flow through the revolution angle sensor at an intermittent cycle based on a time interval of the timer;

the output voltage of the rectification circuit comprises a half-wave rectified voltage for h induced voltages corresponding to the h phases; and the wait period comprises a time corresponding to a revolution angle of angle_a (deg)=360 (deg)÷h (phase), which is acquired from twait_a (sec)=360 (deg)÷h÷k÷(360 (deg)×60 (sec)×r_m (rpm)), where r_m (rpm) is an rpm of a revolution shaft of the brushless motor.

3. The electric power steering device according to claim 1, wherein:

the brushless motor comprises a rotor composed of k pairs of permanent magnets, where a P pole and an N pole of a permanent magnet form one pair, and field coil groups each comprising h coils installed so as to be shifted by a predetermined angle from one another and having electric terminals with h phases;

the cycle switching part is configured to turn on/off a switch in accordance with a trigger from a timer configured to count a clock to measure a period, thereby causing a current to flow through the revolution angle sensor at an intermittent cycle based on a time interval of the timer;

the output voltage of the rectification circuit comprises a full-wave rectified voltage for h induced voltages corresponding to the h phases; and the wait period comprises a time corresponding to a revolution angle of angle_a (deg)=360 (deg)÷h (phase) ÷2, which is acquired from twait_a (sec)=360 (deg)÷h÷2÷k÷(360 (deg)×60 (sec)×r_m (rpm)), where r_m (rpm) is an rpm of a revolution shaft of the brushless motor.

4. The electric power steering device according to claim 1, wherein:

the high rpm detection threshold is set to a value substantially equal to a peak at a minimum predicted high rpm of the brushless motor; and the low rpm detection threshold is set to a value substantially equal to a value that is a forward voltage of a rectification element used for the rectification circuit, and is more than a maximum predicted value of a valley of the forward voltage.

5. The electric power steering device according to claim 2, wherein the cycle switching part is configured to hold a revolution angle of the brushless motor in a previous intermittent cycle under a state in which the first transition state is held, cumulatively add a revolution angle movement amount, which is a difference between the revolution angle held in the previous intermittent cycle and a revolution angle in a current intermittent cycle, for each intermittent excitation cycle, and set as the wait period a time when the revolution angle movement amount represented by the cumulative addition after the first transition state reaches angle_a (deg)=360 (deg)÷h (phase).

6. The electric power steering device according to claim 3, wherein the cycle switching part is configured to hold a revolution angle of the brushless motor in a previous intermittent cycle under a state in which the first transition state is continuously held, cumulatively add a revolution angle movement amount, which is a difference between the revolution angle held in the previous intermittent cycle and a revolution angle in a current intermittent cycle, for each intermittent excitation cycle, and set as the wait period a time when a revolution angle movement amount represented by the cumulative addition after the second transition state reaches angle_b (deg)=360 (deg)÷h (phase)÷2.

7. The electric power steering device according to claim 5, wherein the revolution angular velocity detection part is configured to detect, in place of a motor rpm based on a voltage signal from an induced voltage detection part, a motor rpm from an angle position difference between an output of a revolution angle position detection part that has received an output signal of the revolution angle sensor and an output of the previous cycle angle position holding part.

8. The electric power steering device according to claim 5, wherein the revolution angular velocity detection part is configured to detect, in addition to a motor rpm based on a voltage signal from an induced voltage detection part, a motor rpm from an angle position difference between an output of a revolution angle position detection part that has received an output signal of the revolution angle sensor and an output of the previous cycle angle position holding part.

9. The electric power steering device according to claim 2, wherein:
the high rpm detection threshold is set to a value substantially equal to a peak at a minimum predicted high rpm of the brushless motor; and
the low rpm detection threshold is set to a value substantially equal to a value that is a forward voltage of a rectification element used for the rectification circuit, and is more than a maximum predicted value of a valley of the forward voltage.

10. The electric power steering device according to claim 3, wherein:
the high rpm detection threshold is set to a value substantially equal to a peak at a minimum predicted high rpm of the brushless motor; and
the low rpm detection threshold is set to a value substantially equal to a value that is a forward voltage of a rectification element used for the rectification circuit, and is more than a maximum predicted value of a valley of the forward voltage.

11. The electric power steering device according to claim 6, wherein the revolution angular velocity detection part is configured to detect, in place of a motor rpm based on a voltage signal from an induced voltage detection part, a motor rpm from an angle position difference between an output of a revolution angle position detection part that has received an output signal of the revolution angle sensor and an output of the previous cycle angle position holding part.

12. The electric power steering device according to claim 6, wherein the revolution angular velocity detection part is configured to detect, in addition to a motor rpm based on a voltage signal from an induced voltage detection part, a motor rpm from an angle position difference between an output of a revolution angle position detection part that has received an output signal of the revolution angle sensor and an output of the previous cycle angle position holding part.

* * * * *